United States Patent [19]

Godard

[11] Patent Number: 4,942,566
[45] Date of Patent: Jul. 17, 1990

[54] DEVICE FOR ILLUMINATING AN AUXILIARY TRACK OF A MOTION PICTURE FILM

[75] Inventor: Bruno Godard, Les Ulis, France

[73] Assignee: Societe anonyme dite: Compagnie Generale d'Electricite, Paris, France

[21] Appl. No.: 208,617

[22] Filed: Jun. 20, 1988

[30] Foreign Application Priority Data

Jun. 19, 1987 [FR] France .................. 87 08618

[51] Int. Cl.⁵ .............................. G11B 7/00
[52] U.S. Cl. ....................... 369/113; 369/112; 369/125; 352/11; 352/26; 352/27
[58] Field of Search ............... 352/1, 11, 26, 27, 31; 369/125, 86, 89, 112, 113, 121, 122, 100; 346/76 L

[56] References Cited

U.S. PATENT DOCUMENTS 4,149,781 4/1979 Everett, Jr. ..................... 352/72
4,603,099 7/1986 Drexler ..................... 369/125 X
4,651,313 3/1987 Guez ..................... 369/100 X

FOREIGN PATENT DOCUMENTS 371528 3/1923 Fed. Rep. of Germany.
WO81/01217 4/1981 PCT Int'l Appl..

Primary Examiner—Robert L. Richardson
Attorney, Agent, or Firm—Sughrue, Mion, Zinn, Macpeak & Seas

[57] ABSTRACT

A laser diode (4) emits a beam which is reflected by a plane mirror (12) and by a spherical focusing mirror (2) in order to form a beam (40) which is focused on a read window which is a segment of a read line (6). Said line extends transversely relative to a film (16) running over a drum (20) which rotates about an axis (22). The window occupies the width of the soundtrack on the film. The light passing through said soundtrack is received by a photo cell (34) which provides the sound signal. The invention is particularly applicable to sound motion pictures.

16 Claims, 2 Drawing Sheets

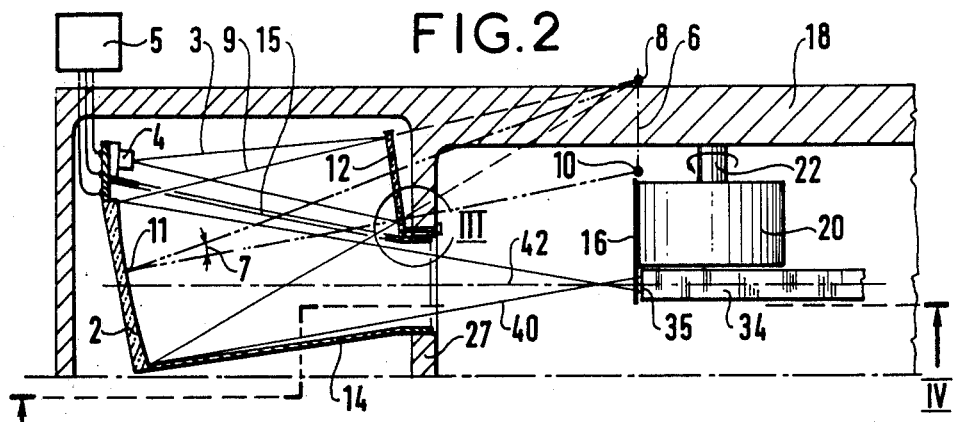
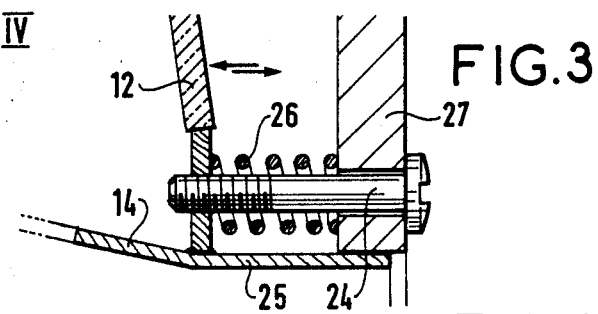
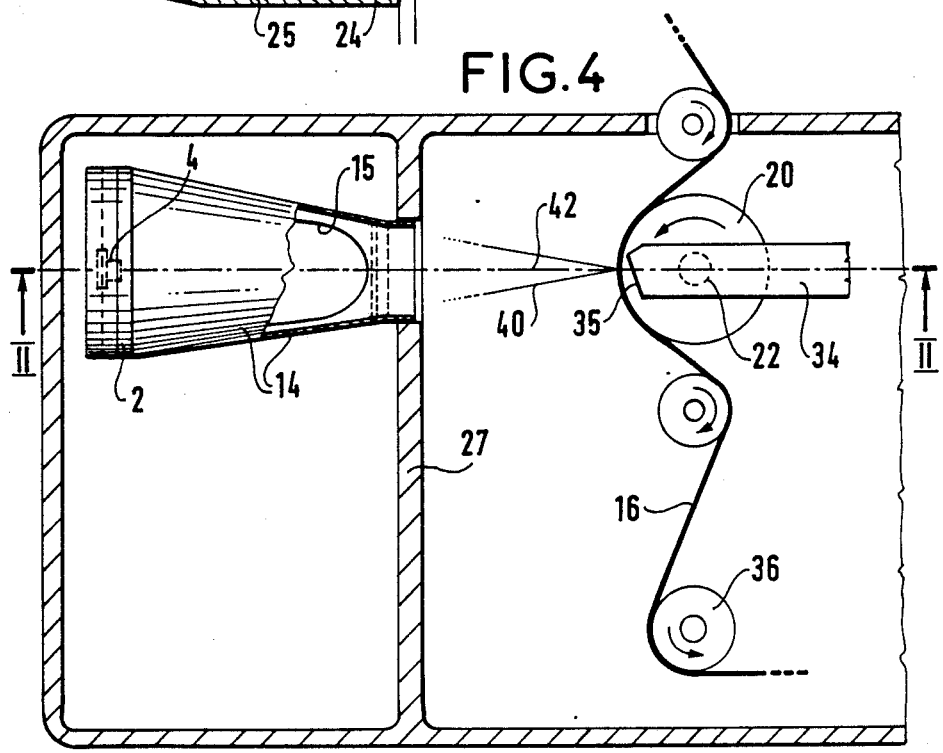

DEVICE FOR ILLUMINATING AN AUXILIARY TRACK OF A MOTION PICTURE FILM

The present invention relates to projecting motion pictures.

BACKGROUND OF THE INVENTION

A film used in such projection comprises a main track which occupies the major fraction of the width of the film which has the images to be projected following one another thereon. Suitable means are provided for causing the main track to run image-by-image between a source of intense light and an objective lens. From the recorded image as illuminated in this way, the lens projects an image on a screen. To the side of said main image-carrying track, the film includes at least one auxiliary recording track, which in practice is a soundtrack conveying a sound signal, but which could equally well convey some other type of auxiliary signal, for example a clock signal or a synchronizing signal, etc. . . .

Recording on said track is performed optically, i.e. the recorded signal is represented by an optical density. It is present practice for a soundtrack to comprise a transparent central fraction of its width together with two opaque fractions extending symmetrically on either side thereof. The signal is constituted by the variable width of the transparent central fraction.

In order to read such a track, it is caused to run at constant speed between a light-emitting head and a photoelectric cell which provides an electrical signal representative of the sound signal to be reproduced. Such a signal may be amplified and applied to loudspeakers in a cinema.

The light-emitting head illuminates the film by forming a read window whose length runs across the width of the auxiliary track and whose width extends in the direction of film displacement.

The auxiliary signal is written, i.e. recorded, in an analogous manner using a light-emitting head in conjunction with a read window which is illuminated over a fraction only of its length, with said fraction being modulated by said signal.

The passband of such a device, i.e. the band of frequencies which it is capable of reproducing, falls off with increasing width of the read window. It is therefore desirable to reduce the width of said window. This effect is due to the fact that the speed at which the film runs is determined by other constraints, and to the fact that the sensitive area of the photo-electric cell extends over a greater width than the width of the above-defined read window, thus ensuring that the width of the photo cell is not a limiting constraint.

One known technique for reducing the width of the read window is to use a light-emitting head including a relatively powerful light source which illuminates a diaphragm having a slit therein. An image of the slit illuminated in this way is then formed on the film by an objective lens. In this prior apparatus, the slit constitutes the above-defined read window.

This prior device suffers from two drawbacks in particular. Firstly, the optical quality of the objective lens makes it impossible to obtain a window which is as narrow as could be desired, even if the slit through the diaphragm is itself sufficiently narrow. This limits the passband of the device. Further, given the limited sensitivity of the photo cell, the light source must be very powerful indeed since only a small fraction of its light passes through the narrow slit through the diaphragm. This gives rise to energy consumption and heating which may be objectionable.

Specific objects of the present invention include:
increasing the passband of a read and/or write device for use with an auxiliary track of a motion picture film (and in particular with a soundtrack); and/or
reducing the electrical power consumed and/or the heat power given off by such a device; and/or
making adjustment of such a device easy; and/or
making said adjustment independent of the wavelength of the light used; and/or
facilitating the insertion of such a device in an existing motion picture apparatus by installing in said apparatus a light-emitting head which is compact and/or easy to manufacture.

SUMMARY OF THE INVENTION

The present invention provides a read and/or write device for use with an auxiliary track (in particular a soundtrack) of a motion picture film, the device being intended to provide at least one read signal representative of an average optical density over at least one narrow read window which is elongate along a read line, and/or to write such a density so as to enable such, a read signal to be generated during subsequent reading, the line being a line transversal to a film which runs along a run direction, the length of the read window covering, at least ,in part, the width of an auxiliary recording track written on the film to record an auxiliary signal such, that the read signal or the written density represents the auxiliary signal, the parasitic width of the window being oriented along the direction in which the film runs and limiting the frequency passband of the device.

said device comprising for this purpose:
the device comprises a source of light; an optical system forming the light into a read and/or write beam focused on the film in order to illuminate a narrow light spot which forms the read window; and a transducer such as a read photo cell receiving the light which is transmitted or reflected by the film in response to the read beam, the photo cell providing the read signal in response to the received light, and/or a modulator modulating the write beam, in response to the auxiliary signal to be written;

the light source is selected to form an incident light beam which has at least a virtual point origin at a finite or an infinite distance and which propagates along a mean incident direction, with the point origin being disposed on the read line.

the optical system is constituted by a concave focusing mirror whose surface is a portion of a surface of revolution about an axis of revolution which coincides with the read line, such that all light rays coming from the point origin and encountering the mirror are reflected towards the read line, with the normal to the center point of the mirror forming a mean angle of inclination with the mean incident direction, the angle of inclination and the angular extent of the mirror on either side of the central point in a plane passing through the read line being selected so that the beam reflected by the mirror illuminates the entire length of the read window.

Preferably, the mean angle of inclination lies between 5° and 85°.

Also, preferably, the surface of revolution is a spherical surface so as to be easily formed, and so that coincidence between one of the axes of revolution and the read line is intrinsically achieved by situating the point origin and the center of the read spherical surface on the line.

The present invention also provides a head which is intended for mounting in a motion picture apparatus in order to constitute a read and/or write device, the head comprising: a frame; the light source carried by the frame; the focusing mirror carried by the frame; and frame fixing means for fixing the frame to the motion picture apparatus in such a manner that the position of the source relative to the mirror is adjusted prior to fixing the head to the motion picture apparatus.

The head has a longitudinal direction along a mean direction of the read beam, with a front end and a rear end such that the beam propagates from the rear end towards the front end, with two directions substantially perpendicular to each other and to the longitudinal direction being a running direction which is intended to be oriented parallel to the running direction of the film, and a transverse direction oriented parallel to the read line.

The invention preferably includes a front assembly and a rear assembly interconnected by the frame, the rear assembly comprising the focusing mirror and the source of light, with the source being offset relative to the mirror along said transverse direction towards a side which is a light arrival side, the source emitting a primary light beam which is forwardly directed. The front assembly comprises a mirror receiving the primary beam and reflecting it rearwardly towards the focusing mirror in order to form the incident beam.

The frame fixing means are in the form of a hollow cylindrical or prismatic fixing structure having generator lines extending along the longitudinal direction, the fixing means belonging to the front assembly and locally surrounding the read and/or write beam, thereby enabling the frame to be fixed by the fixing structure sliding in an illumination opening formed in a support wall belonging to the motion picture apparatus, with the opening being provided to pass said read beam.

The mirror is offset relative to the structure along the transverse direction towards the light arrival side.

The head further includes means for adjusting and fixing its position, the means bearing against said wall of the support in order to enable the position of the read beam to be adjusted by sliding the fixing structure in the illumination opening.

The light source is a semiconductor laser diode emitting a primary beam having a point origin at finite distance, the beam having relatively low divergence (about 20°), thereby avoiding objectionable energy losses and/or heating.

The present invention is naturally equally applicable to cases where the above-mentioned auxiliary signal is in analog form or is in digital form.

BRIEF DESCRIPTION OF THE DRAWINGS

An implementation of the invention is described in greater detail by way of non-limiting example and with reference to the accompanying diagrammatic figures. When the same item appears in several of the figures, it is designated therein by the same reference symbol. It should be understood that the items mentioned may be replaced by other items providing the same technical functions.

The embodiment described relates to a read-only device mounted in a projector which constitutes the above-mentioned motion picture apparatus. It includes all of the dispositions mentioned above as constituting subject matter of the invention.

FIG. 2 is a fragmentary view of said projector in section on a horizontal plane II—II of FIG. 4 and as seen from above;

FIG. 3 shows a detail III of FIG. 2 on a larger scale; and

FIG. 4 is a fragmentary side view of said projector in section on a vertical plane IV—IV of FIG. 2.

DETAILED DESCRIPTION OF THE INVENTION

Figure 1:
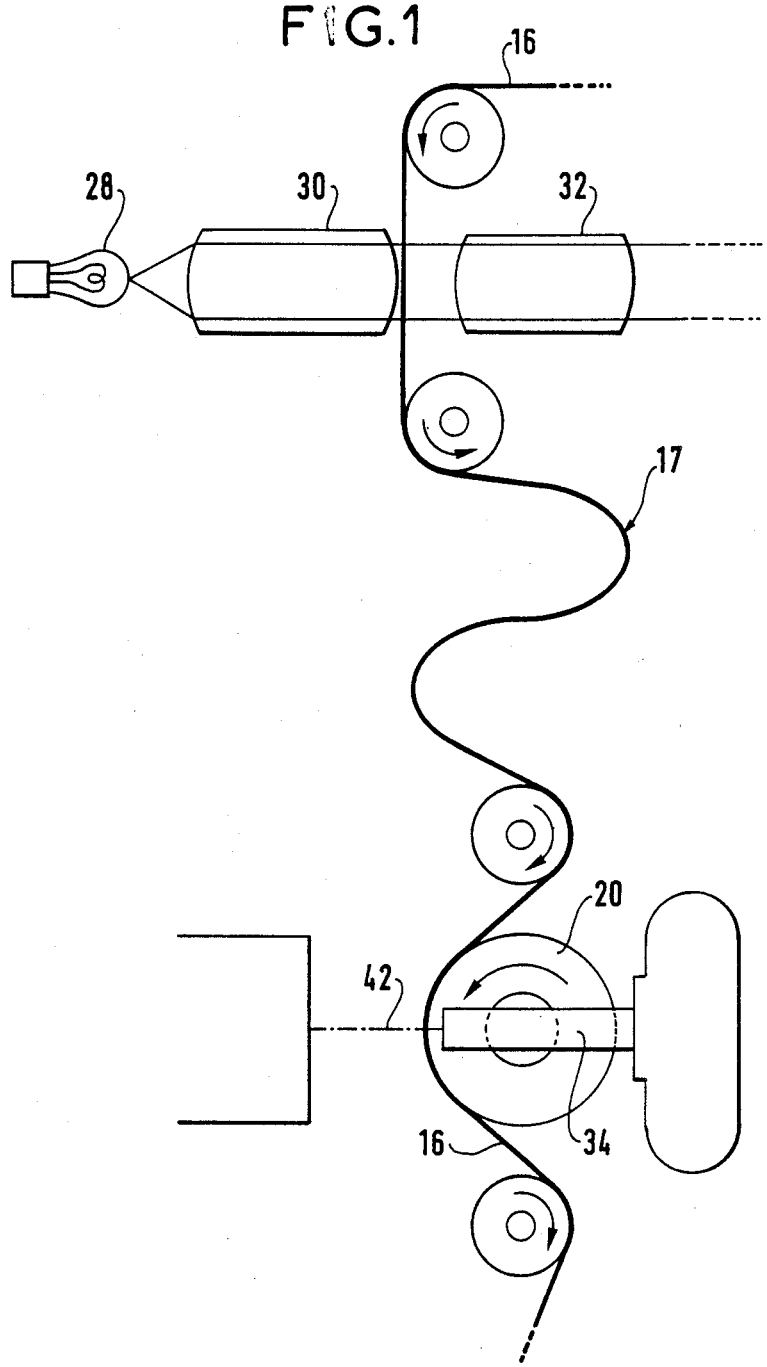
FIG. 1 is a fragmentary side view of a motion picture projector which is provided with a device in accordance with the invention and which has had its side wall removed in order to show both the, film and said device.

As shown in FIG. 1, a moving picture projector serves to project a film 16 which is paid out from a supply spool (not shown) and which is taken up by a take-up spool (also not shown). The projector performs two functions simultaneously. It projects images on a screen and it provides amplifiers and loudspeakers with two electrical signals representative of stereophonic sound. The film is provided, for this purpose, with a main track for the images and with two auxiliary tracks disposed on the same side of the main track for conveying the sound. In order to simplify the explanation, it is assumed below that there is only one such track and it is referred to as the soundtrack.

The film passes initially in front of a powerful projection lamp 28 which illuminates an image via a condenser lens 30. The light transmitted through said recorded image is projected by an optical lens 32 on a projection screen (not shown). The film is driven discontinuously, image-by-image, by a drive device (not shown). Thereafter, it forms a loop 17 of cyclically variable length enabling it to be subsequently driven continuously over a read drum 20 by a take-up wheel 36 (see FIG. 4), thereby enabling the soundtrack to be read. To this end, the drum 20 which rotates about an axis 22 parallel to said transverse direction is narrower in said transverse direction than the film, thereby allowing light to pass freely through the soundtrack.

A photo cell 34 having a sensitive area 35 (FIGS. 2 and 4) is located on a longitudinally forward side of the film in the immediate proximity of the film and the drum 20 and facing the soundtrack, thereby enabling it to receive that fraction of illuminating light which has passed through the soundtrack and thus serving to supply the read signal. This signal is representative of the sound which corresponds to the images being projected at the same instant.

The illuminating light in question is directed onto the film in the form of a read beam 40 by means of a removable light-emitting head comprising a frame 14 which is generally in the form of a truncated hollow cone about a longitudinal axis 42 coinciding with the axis of the beam 40. This frame fits more or less around the rear portion of the read beam 40 where it exists inside the frame. It is forwardly extended from its small base as shown in more detail in FIG. 3, by a short tubular fixing structure having longitudinally extending generator lines 25 and which is a push fit in a circular illumination opening. This opening is formed in a thick support wall 27 forming a part of the main frame of the projector. It faces the photo cell 34. Fixing and position-adjusting means are provided for the frame. They are represented symbolically in FIG. 3 in the form of a screw 24 whose head bears against the front face of the wall 27 and whose shank passes through the wall 27 and screws into a tapped hole fixed to the frame 14. Slack is taken up by a return spring 26 surrounding the shank of screw 24 and pressing against the rear face of the wall 27 of the projector frame.

The emitted light is monochromatic and coherent. It is emitted in the form of a primary beam 3 having a wavelength of 0.78 micrometers, for example, by a laser diode 4 which is carried at the rear of the frame 14 and which forms a portion of the above-specified rear assembly 2, 4. This diode is powered and regulated from a housing 5. In a write device, it would be modulated from said housing. It is mounted in such a manner as to enable its position to be adjusted. It provides a low divergence beam having a substantially point origin. This beam is directed forwardly and is reflected by a plane mirror 12 carried at the front of the frame 14 in order to form the above-specified incident beam 9. The mirror is disposed in such a manner as to cause the virtual point origin 8 of the incident beam (possibly after adjusting the position of the diode 4) to be situated on a read line 6 which is in alignment with a generator line of the drum 20 facing the sensitive area 35 of the photo cell 34. The desired result, which is indeed obtained, is that the read line 6 is in the form of an extension of a line transverse to the length of film whose main track is pressing against the drum 20. The portion of the read line 6 which extends over the width of the soundtrack constitutes the above-mentioned elongate read window.

The plane shape of the mirror has the advantage of forming an aberration-free point virtual image, while also being simple to make and cheap.

The position of the read image is naturally adjusted so as not to be exactly on a generator line of the cylindrical surface of the read drum 20, but so as to lie on the printed face of the film 16.

Although the incident beam constituted in this way has a point origin at finite distance, it should be understood that it would also be possible, within the scope of the present invention, to make use of an incident beam whose point origin would still lie on the same read line, but at an infinite distance, i.e. for the incident beam to be a parallel beam whose direction corresponds with the direction of the read line.

The read beam 40 is formed from the incident beam 9 by reflection on a focusing mirror 2 which is carried at the rear of the frame 14. The incident beam is allowed to pass through a large opening 15 formed for this purpose in the frustoconical wall of the frame 14. The mirror 2, or more precisely its reflecting surface, constitutes a portion of a spherical surface whose center 10 is situated on the read line 6 substantially half-way between the virtual source 8 and the middle of the width of the soundtrack on the film 16. This center 10 constitutes the center of curvature of the mirror 2.

Although the use of a spherical surface appears to be advantageous in the context of the present invention for reasons of ease of manufacture, it must be understood that the essential point is merely that the focusing mirror constitutes a surface of revolution about the read line. This ensures that any incident light ray considered as being a straight line passing through the point source 8 is reflected by the focusing mirror along a ray direction which passes exactly through the read line. This ensures that the width of the read window formed on the film by the rays is theoretically nil, the width being measured in the direction of film displacement.

This is true for geometrical objects, but it should be understood that in fact phenomena related to diffraction and to the size of the source ensure that the width may be greater than the wavelength of the light being used but is nevertheless much smaller than widths obtainable in prior art devices for the same amount of illumination.

Nevertheless, the entire width of the soundtrack must be illuminated. This is obtained, in particular, by suitably choosing the above-mentioned mean angle of inclination. This angle 7 may be measured, for example, from the center 11 of the mirror 2. It extends between directions going from the center towards said point source 8 and towards said center of curvature 10. It is equal to 10°, for example, so that the angular extent of the incident beam is equal to 20°, for example.

The advantages of the device described stem, in particular, from the fact that practically all of the light energy emitted by the diode 4 passes through an extremely narrow read window. However, it may be advantageous to loose a small fraction of this energy by causing the reflecting surface of the mirror 2 or of the mirror 12 to be specially shaped to make the illumination of the window as uniform as possible, e.g. by having a surface which is generally rectangular in shape with concave sides. Alternatively specially shaped could be used for the same purpose.

What is claimed is:

1. An illuminating device for illuminating an auxiliary track of a motion picture film running in a run direction, over at least one read window which is elongate along a read line transverse to said run direction, the length of said read window being at least equal to the width of said auxiliary track, said device comprising:

a source of light for forming an incident light beam having a virtual point origin on said read line and propagating along a mean incident direction; and an optical system for forming said incident light beam into an illuminating beam focused on said film in order to illuminate said area in the plane of said film corresponding to said read window, said optical system comprising a concave focusing mirror having a reflecting surface which has a center point and which is a portion of a surface of revolution about an axis of revolution which coincides with said read line, such that all light rays coming from said point origin and irradiating said reflecting surface are reflecting towards said line, with a normal to the center point of said mirror forming a mean angle of inclination with said mean incident direction, said angle of inclination and the angular extent of said mirror on either side of said center point in a plane passing through said read line being such that the beam reflected by said mirror illuminates the entire length of the read window.

2. A device according to claim 1, wherein said mean angle of inclination lies between 5° and 85°.

3. A device according to claim 1, wherein said surface of revolution is a spherical surface.

4. A device according to claim 1, for use in combination with a motion picture apparatus having a housing, further comprising:

a frame for carrying said light source and said focusing mirror; and frame fixing means for fixing said frame to said housing in such a manner that the position of said source relative to said mirror is adjusted prior to fixing said head to said housing.

5. A device according to claim 4, wherein said light source, focusing mirror, frame and frame fixing means comprise a light-emitting head, said head having a front end and a rear end and a longitudinal direction parallel to said mean incident direction of said illuminating beam, said beam propagating from the rear end towards the front end, with said run direction and a transverse direction parallel to said read line being substantially perpendicular to each other and to said longitudinal direction said head further comprising a front assembly and a rear assembly interconnected by said frame, said rear assembly comprising said focusing mirror and said source of light, said source being offset relative to said mirror along said transverse direction towards a side which is a light arrival side, said source emitting a primary light beam which is forwardly directed; and said front assembly comprising a further mirror receiving said primary beam and reflecting it rearwardly towards said focusing mirror in order to form said incident beam.

6. A device according to claim 5, wherein said housing includes a support wall having an illumination opening therein, and wherein said frame fixing means comprise a fixing structure having generator lines extending along said longitudinal direction, said fixing means belonging to said front assembly and locally surrounding said illuminating beam, said frame being fixed to said housing by sliding said fixing structure into said illumination opening, said illuminating beam passing through said opening; with said further mirror being offset relative to said fixing structure along said transverse direction towards said light arrival side.

7. A device according to claim 6, further including adjustment means for adjusting and fixing the position of said light-emitting head, said adjustment means bearing against said support wall whereby the position of said read beam can be adjusted by sliding said fixing structure in said illumination opening.

8. A device according to claim 7, wherein said adjustment means comprise a screw and a return spring.

9. A device according to claim 4, wherein said source of light is a semiconductor laser diode emitting a primary beam having a point origin at a finite distance, said primary beam having a low divergence to thereby minimize energy losses.

10. A device according to claim 5, wherein said further mirror is a plane mirror.

11. A device according to claim 4, wherein the position of said light source relative to said frame is adjustable.

12. A device according to claim 2, wherein said surface of revolution is a spherical surface.

13. A device for generating a read signal representing an average of an optical characteristic across said read window, said device including the illuminating device according to claim 1 and further including a transducer receiving light from said film in response to said illuminating beam and providing said read signal in response thereto.

14. A device for optically recording information on an auxiliary track of a motion picture film, said device including the illuminating device according to claim 1 and further including modulating means for modulating said irradiating beam in accordance with said information.

15. A device according to claim 1, wherein said optical characteristic is reflectivity.

16. A device according to claim 1, wherein said optical characteristic is transmissivity.

* * * * *